INVENTOR.
DAVID C. KALBFELL
BY
George E. Pearson
ATTORNEY

INVENTOR.
DAVID C. KALBFELL
BY George E. Pearson
ATTORNEY

INVENTOR.
DAVID C. KALBFELL
BY George E. Pearson
ATTORNEY

INVENTOR.
DAVID C. KALBFELL
BY George E. Pearson
ATTORNEY

Aug. 10, 1965 D. C. KALBFELL 3,200,256

MAGNETIC COMMUTATION METHODS AND SYSTEMS THEREFOR

Filed March 25, 1960

6 Sheets-Sheet 5

INVENTOR.
DAVID C. KALBFELL
BY George E. Pearson
ATTORNEY

INVENTOR.
DAVID C. KALBFELL
BY George E. Pearson
ATTORNEY

United States Patent Office 3,200,256
Patented Aug. 10, 1965

3,200,256

MAGNETIC COMMUTATION METHODS AND SYSTEMS THEREFOR

David C. Kalbfell, P.O. Box 10764, San Diego, Calif.

Filed Mar. 25, 1960, Ser. No. 17,554
11 Claims. (Cl. 307—88)

This invention relates generally to commutating methods and systems and more particularly to those utilizing magnetic amplifiers as switching elements for switching a plurality of input signals to a common output terminal without interrupting the input or output circuits.

This application is a continuation in part of my application for Magnetic Commutator and Measuring Apparatus, Serial No. 652,969, filed April 15, 1957, now Patent No. 2,978,694, which discloses and claims a commutating system wherein a plurality of input signals continuously applied respectively to the input windings of a plurality of magnetic amplifiers are amplified and presented serially in time sequence on a common output terminal, this being accomplished in the specific arrangement disclosed by switching carrier current to the carrier windings of the amplifiers selectively one at a time in successive order.

The invention broadly is for a method of commutation in which the continuously applied input signals are commutated by sequentially activating the magnetic amplifiers such that only the activated amplifier produces an output signal at the common output terminal. As otherwise expressed, all but successively different ones of the magnetic amplifiers are de-activated sequentially with the result that the successively produced output signals are presented serially at the common output terminal.

Thus, in accordance with this method, the desired commutation is accomplished without interrupting either the input or output circuits by continuously applying the input signals to the input windings individual thereto, there being one magnetic amplifier for each input channel, presenting the amplified signals at a common output terminal, and sequentially de-activating all but successively different ones of the magnetic amplifiers thereby to present the amplified signals as a series at their common output terminal.

Activation or de-activation, as the case may be, of the magnetic amplifiers may be accomplished in several ways and by various means such as by switching carrier current through use of a switching matrix and gates as disclosed in the aforementioned copending application. Switching the carrier windings, in service, has been found to be a satisfactory and effective means of commutating the continuously applied input signals, but this method and system of commutation has the disadvantage, in operation, which follows from the fact that the carrier current, whether uni-directional or bi-directional alternating current, cannot be switched off completely due to capacitive coupling effects, particularly at high carrier frequencies.

Alternatively, the magnetic amplifiers may be de-activated by saturating their cores while continuously applying both the input signals and the carrier current, and each magnetic amplifier may then be activated one at a time by unsaturating its cores, or otherwise restoring the magnetic amplifier to a suitable operating point.

It is within the scope of this invention to control the condition of de-activation of the magnetic amplifiers by saturation of the cores whether by internally induced fluxes or by externally applied fields. In accordance with a preferred form of control, however, the cores of each magnetic amplifier are saturated by a first pair of continuously energized static bias windings, and each magnetic amplifier, in turn, is magnetically activated in a manner sufficient to neutralize the magnetomotive force due to the steady current in the static bias windings and establish a suitable operating point, this being accomplished preferably by employing a second pair of bias counterbias or neutralizing windings to which bias current may be switched to set up a counter magnetomotive force.

It is further preferred, that the static bias windings be connected in series with a suitable bias source and the neutralizing bias windings sequentially switched in series with the static string to thus insure that both the static and neutralizing windings maintain constant relative magnetization of the cores during each of the periods of activation of the magnetic amplifier individual thereto. It will be appreciated that were separate bias supplies to be used for the static and neutralizing windings, or parallel circuits employed therefor for energization from a common source, errors would be introduced in the event of drift between the two bias supplies or in the event of variations in circuit resistance due, for example, to changes in ambient or operating temperature. In the aforedescribed series arrangement, the static and neutralizing windings receive the same bias current and thus, return of the cores to the same operating point from cycle to cycle of the commutation process is assured notwithstanding the fact that the single bias source may drift from time to time.

In accordance with one of the commutation systems of the present invention, a family of magnetic amplifiers which are to be commutated is so arranged and each magnetic amplifier so constructed that carrier current flows continually through all of the magnetic amplifiers in series. Each magnetic amplifier comprises two pairs of bias windings, one of which carries saturating bias current continuously and aids the carrier current when the magnetic amplifier is of a null detector type employing uni-directional carrier current and operable on the fundamental frequency thereof. A magnetic amplifier of this type is disclosed and claimed in my copending application for Magnetic Null Detecting System, Serial No. 669,336, filed July 1, 1957, now Patent No. 2,989,648. Alternatively, the magnetic amplifiers may be of a second harmonic type in which case the carrier current is bi-directional alternating current, and the phase relationship of the static bias current to the carrier current is unimportant. As will more fully appear as the description proceeds, the second harmonic type magnetic amplifier is structurally similar to the null detector type and differs mainly only in the manner of operation, the second harmonic type being optionally operable either at high or low magnetomotive force levels and driven to both sides of the B axis of its B-H curve and unsymmetrically to either side thereof selectively in accordance with the polarity of the input signal whereby even harmonics of the carrier frequency are induced in the output winding and have a phase related to the polarity of the input signal and an amplitude proportional to the magnitude of the input signal.

In either case, whether the null detector or harmonic type, the magnetic amplifier has the second pair of bias windings switched as by a switching matrix to provide a suitable direct current to neutralize the magnetomotive force set up by the current in the static bias windings. This neutralization must be of suitable degree depending upon the type of the magnetic amplifier, the switched bias current being exactly equal to the unswitched bias current in the case of the harmonic amplifier and, to this end, the neutralizing windings being switched in series with the static windings, as aforementioned. In the case of null detector type amplifier, the neutralizing bias current must be of a larger magnitude than the static bias current in order to get to a suitable operating point. However, by simply putting more turns on the switched windings than on the static saturating windings, the neutralizing windings of the null detector amplifier may also be switched in series with the static bias windings and thus all energized with the same current from the same D.C. source of bias.

In the case of the second harmonic magnetic amplifier, when operated at low magnetomotive force levels, remanent effects due to the D.C. signal inputs may prevent return of the operating point to the B axis upon neutralization of the static bias and, accordingly, provision is made for demagnetizing the cores concurrently with activation of each magnetic amplifier or, as otherwise expressed, upon switching to each new input channel.

It is further within the scope of the present invention to provide for switching either or both the carrier windings and the neutralizing bias windings in accordance with the mode best adapted to serve a particular purpose and to increase the effectiveness of the commutation system when this is desired.

The effectiveness of saturation as a means of de-activating the magnetic amplifiers depends upon the degree of flatness of the B-H curve obtainable in the region of saturation and further depends upon unbalance and transformer effects which occur during the essentially air-core condition of the coils which prevails with complete saturation of the magnetic cores. Since balance of the windings is normally effected and predicated on an iron-core condition of the windings, unbalance inherent in the windings per se becomes manifest when the air-core condition prevails. The effectiveness of the de-activation of the non-commutated or dead channels in the case of carrier switching depends partly on the reduction of inductance of the series connected output windings during the inactive periods and, to accomplish this, it is necessary that the cores be biased such that the operating point is established well into the region of saturation. In order to avoid extreme bias in the case of carrier switching and spurious outputs due to incomplete saturation and air-core effects in the case of bias switching, a combination of the two types of switching, i.e., carrier and bias, may be employed and optimum results obtained without requiring complete observance of the precautions usually considered necessary when either type of switching is used alone.

In accordance with a preferred commutation method and system of the present invention, an equivalent combination carrier-bias switching arrangement is provided in which each magnetic amplifier of a family of such amplifiers comprises saturating and neutralizing windings, as aforedescribed, to set up a static operating point from a condition of saturation in response to gating of the neutralizing windings of the activated channel into series with the static saturating bias string. In this arrangement, however, carrier windings per se are not required and, in lieu thereof, the neutralizing windings are made to serve their purpose. This is accomplished in a so-called bypass mode by periodically bypassing a portion of the neutralizing current which would otherwise establish the activated magnetic amplifier at its static operating point, the amount of current thus bypassing being sufficient to sweep the cores through the B-H loop in the same manner as where carrier current is supplied to the carrier windings, as aforedescribed. The commutation method is thus one in which a channel activated by a process of neutralizing a saturating flux, simulates the effect of carrier-induced fluxes by a process of periodically cancelling or subtracting a portion of the neutralizing flux.

In a so-called D.C. component mode, which is the preferred mode, the carrier current is superimposed on the neutralizing current as it is switched to each of the neutralizing windings to thus sweep the cores through the desired B-H loop, as before. It is a significant feature of this mode, that by holding the amplitude of the carrier current at a value less than the magnitude of the D.C. neutralization current, i.e., less than 100% modulation of the neutralizing current which acts as a D.C. component, the effective instantaneous current is fluctuating D.C. and will thus pass through diodes employed in a two-dimensional matrix.

It is therefore an object of the present invention to provide new and improved commutating methods and systems utilizing magnetic amplifiers.

Another object is to provide a commutation method utilizing magnetic amplifiers as switching elements.

Another object is to provide a commutation method in which selective switching and activation of a family of magnetic amplifiers is utilized to present continuously applied inputs serially on a common output.

Another object is to provide a magnetic commutation method in which selective switching and activation of a family of magnetic amplifiers is accomplished by switching carrier current to the carrier windings in successive order.

Another object is to provide a magnetic commutation method and system in which selective switching and activation of a family of magnetic amplifiers is accomplished without introducing undesired capacitive coupling effects.

A further object is to provide a magnetic commutation method and system in which selective switching of a family of magnetic amplifiers is accomplishted by saturating the cores of the magnetic amplifiers and neutralizing the saturation of each in successive order to establish a predetermined operating point.

A further object in the magnetic commutation of a plurality of input singals is to provide a method and system of establishing saturating static and neutralizing bias currents for selectively activating each one and concurrently de-activating the remaining ones of a family of magnetic amplifiers to establish a predetermined operating point in the activated one of the amplifiers.

A further object is to provide a method and system of setting up saturating static and neutralizing bias currents which is independent of drifts in the bias source.

Still another object resides in the provision of a static and neutralizing bias method and system which is equally applicable to magnetic amplifiers of the null detector and second harmonic types.

Still another object in a magnetic commutator utilizing magnetic amplifiers of the second harmonic type is to provide means for de-magnetizing the cores to remove remanent effects due to the D.C. inputs.

An additional object is to provide a method and system of commutating a plurality of input signals in which each of a family of magnetic amplifiers is activated by simultaneously switching carrier and bias currents thereto.

Yet another object in a magnetic commutation system utilizing bias switching control is to provide a bias switching arrangement in which the same bias current is supplied to static and neutralizing windings.

Still another object is to provide a magnetic commutator method and system in which the static operating point of an activated channel is established by neutralizing a saturating flux and carrier-induced fluxes are simulated by periodically subtracting a portion of the neutralizing flux.

Still another object is to provide a magnetic commutator method and system in which the neutralizing current serves as a D.C. component in relation to the carrier current.

Still other features, advantages, and objects of the present invention will become more fully apparent as the description proceeds, reference being had to the accompanying drawings wherein.

Figure 1:
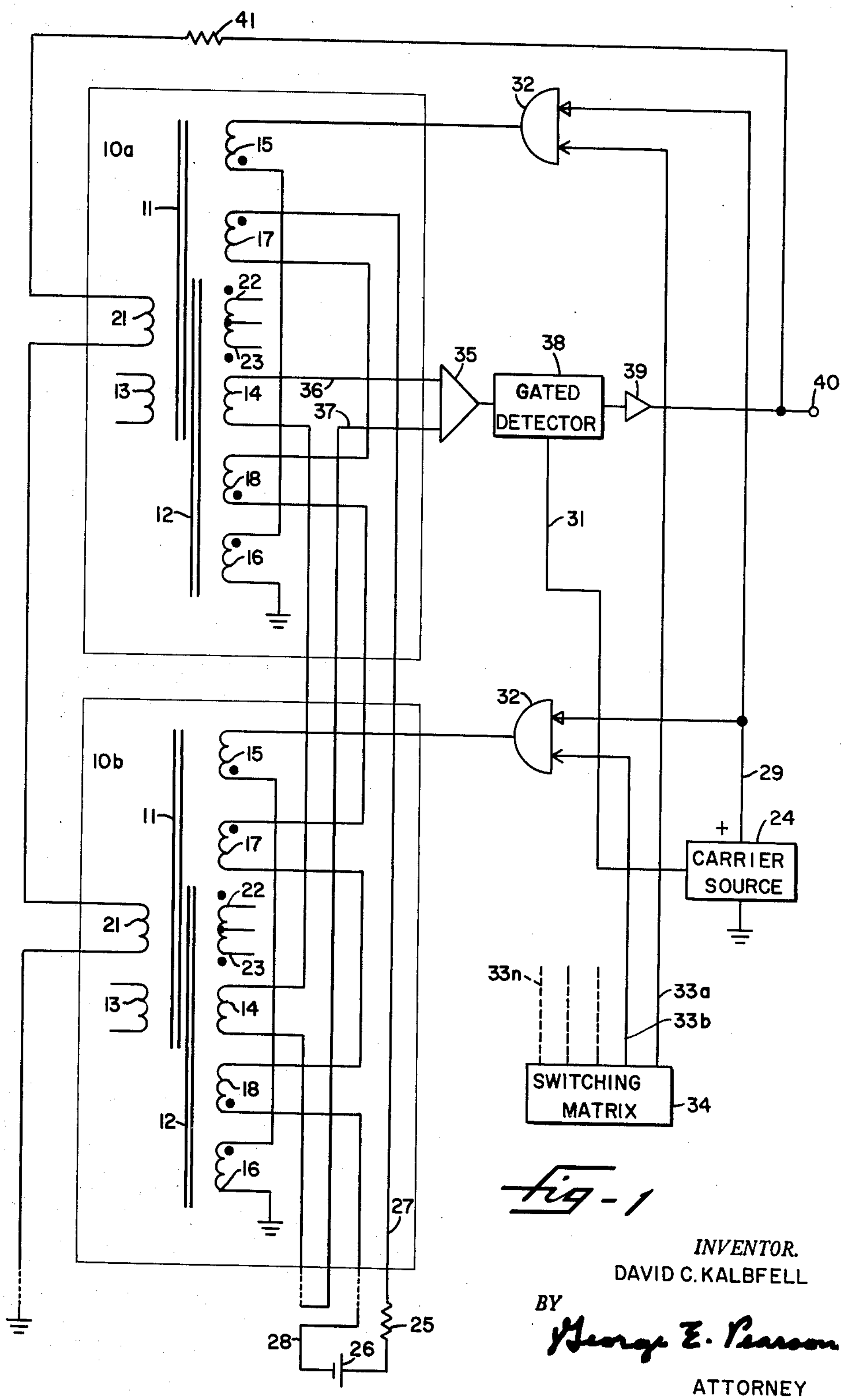
FIG. 1 is a circuit diagram illustrating a carrier switching magnetic commutation system for practicing the carrier switching commutation method of the present invention.

Referring now to the drawings for a more complete understanding of the invention and first more particularly to FIG. 1, there is shown thereon, a carrier switching commutation system comprising a family of magnetic amplifiers 10*a*, 10*b*, . . . 10*n* each of which comprises a pair of cores 11 and 12 which preferably are toroidal in form and constructed of a magnetic material such, for example, as ferrite but preferably is formed of Permalloy in the form of thin tape. In general, any core material providing high maximum differential permeability such, for example, as Supermalloy, will give satisfactory results.

Each magnetic amplifier also comprises input and output windings 13 and 14 which are carried by both the cores, a pair of carrier windings 15 and 16, and a pair of static bias windings 17 and 18, of which the windings of each pair are separately carried by the cores 11 and 12, respectively. Each magnetic amplifier further comprises a feedback winding 21 and balance windings 22 and 23 which are carried by both cores 11 and 12.

A magnetic amplifier, as aforedescribed, is generally similar to that disclosed in my aforesaid application for Magnetic Null Detecting System, and the commutation system disclosed in FIG. 1 is generally similar to that disclosetd in my aforesaid application for Magnetic Commutator and Measuring Apparatus wherein, as in the case of the carrier source 24 and the carrier windings 15, 16 of FIG. 1, the carrier source is switched to the carrier windings in sequential order to thus sequentially activate the magnetic amplifiers individual thereto. In this case, all of the static bias windings 17, 18 are connected in series with a rsistor 25 across a source of uni-directional current 26, resistor 25 being connected to series line 27 and source 26 being connected to series line 28.

In the carrier switching arrangement, carrier source 24 may comprise a generator for producing a sine wave and means including a D.C. source associated therewith for producing a pulse wave output on line 29, line 29, for example, having positive (+) polarity, as indicated, when the carrier output is uni-directional. Carrier source 24 also comprises a source of timing pulses derived from the generator output and cooperatively associated with suitable synchronizing circuits to provide an output gating pulse on line 31, for a purpose hereinafter to be described.

Line 29 is applied to the steady state inputs of a plurality of "AND" gates 32 of which there is one for each magnetic amplifier, the output of each of these gates being connected to the carrier winding 15 of the magnetic amplifier individual thereto. Carrier windings 15 and 16 of each magnetic amplifier are connected in series to ground with the magnetic polarities indicated by the dots associated therewith. The pulsed inputs of gates 32 are connected respectively to lines 33*a*, 33*b* . . . 33*n*, these lines being sequentially supplied with pulses from a suitable switching matrix 34 which may comprise a ring counter or shift register or system of flip-flops and gates.

In the commutation of a plurality of input signals in the arrangement thus far described, the input signals are continuously applied to the input windings 13 of amplifiers 10*a*, 10*b*, . . . 10*n*, respectively, and their outputs appearing respectively across the windings 14 are presented to a common output, here shown to be an amplifier 35. For this purpose, the output windings 14 are all connected in series through the lines 36 and 37 feeding amplifier 35.

Figure 2:
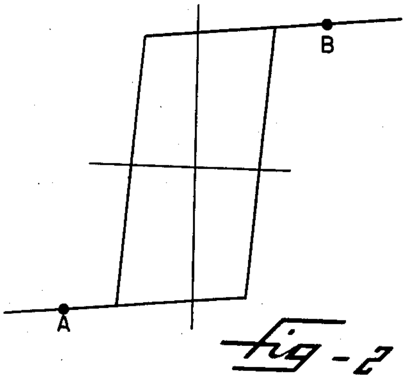
FIG. 2 is a view of a B-H curve which illutrates operation of the circuit of FIG. 1, the commutation method being one which utilizes magnetic amplifiers of the null detector type.

The current supplied to static bias windings 17 and 18 from source 26 through resistor 25 is preferably such as to operate the magnetic amplifiers in the region of point A in the B-H curve disclosed in FIG. 2, this being in the absence of an input signal or where the net input signal is at zero level. Assuming that the net signal input to one of the magnetic amplifiers such, for example, as 10*a* is zero, assuming further that point A is moved to the right to point B in FIG. 2 in response to carrier current supplied to windings 15 and 16 through gate 32, and that the windings have magnetic polarities as indicated by the conventional dots associated therewith, equal and opposite voltages are then induced in output winding 14, and since these cancel, no output voltage is produced for zero input. When the input is other than zero, opposite magnetic effects and different starting points are produced in the two cores 11 and 12 such that, when the carrier current is applied, one core will produce an E.M.F. in winding 14 which occurs later in time and has a slightly smaller amplitude than that produced from starting point A. The E.M.F. induced in the other core, however, will have its maximum output at an earlier time and will have a slightly larger magnitude than that produced from starting point A. When these E.M.F.'s are subtracted, a small differential voltage appears across output winding 14.

As more fully set forth in my aforesaid application for Magnetic Null Detecting System, the differential voltage pulse appearing on the output winding 14 has a complex waveform of which a particular portion provides a D.C. output sensitive to the polarity of the input signal. It is the function of gate detector 38 to select this portion of the waveform in response to the gating pulse received from carrier source 24 via line 31. For this purpose, detector 38 may be a conventional "AND" gate. The D.C. output from detector 38 is suitably amplified by the power amplifier 39 and presented at the output terminal 40 and is also supplied as feedback current through a resistor 41 in series with the series connected feedback windings 21 of all the magnetic amplifiers.

Both feedback and input currents are thus continuously present in each of the magnetic amplifiers at all times, and the net signal input in each amplifier tends to produce an output or feedback current which will null its input signal. Each magnetic amplifier, of course, is operative only at such time as carrier current is supplied thereto and, hence, the respective outputs from the family of magnetic amplifiers 10*a*, 10*b*, . . . 10*n* appear sequentially in successive order at terminal 40 at the switching rate of matrix 34.

Figure 3:
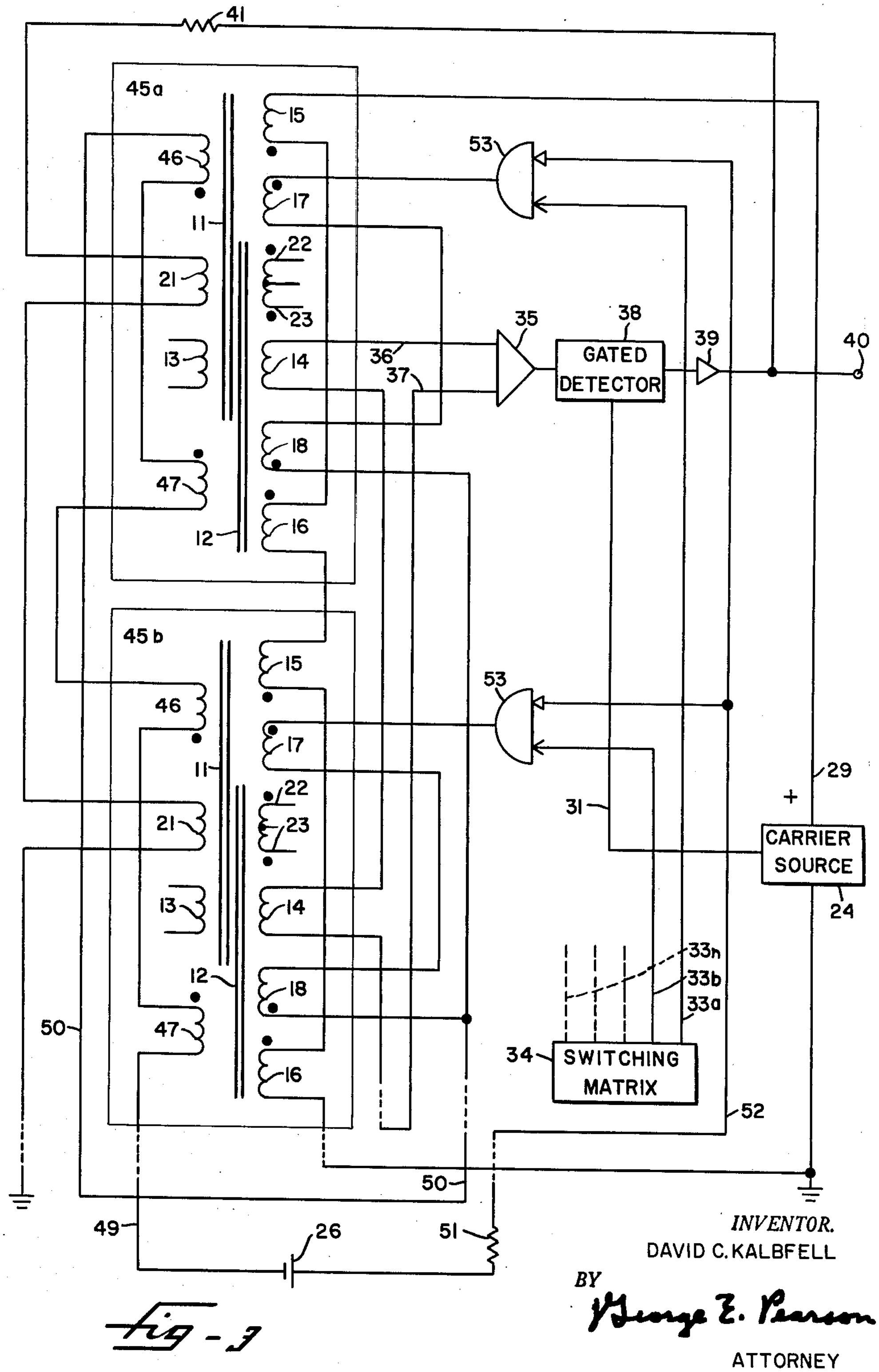
FIG 3 is a circuit diagram illustrating a bias switching magnetic commutation system for practicing the bias switching commutation method of the present invention.

Referring now to FIG. 3, there is shown thereon, a bias switching commutation system comprising a family of magnetic amplifiers 45*a*, 45*b*, . . . 45*n* each of which is generally similar to the magnetic amplifiers disclosed in FIG. 1 except for the additional static saturating windings 46 and 47 which are separately carried by the cores 11 and 12, respectively. Windings 46 and 47 of all the amplifiers 45*a*, 45*b*, . . . 45*n* are connected in series between lines 49 and 50, line 49 being connected to uni-directional bias source 26, which, in turn, is connected to a suitable current limiting resistor 51.

Line 52 from resistor 51 is applied to the steady state inputs of a plurality of conventional "AND" gates 53 of which there is one for each magnetic amplifier, the output of each of these gates being connected to the bias winding 17 of the magnetic amplifier individual thereto. Bias windings 17 and 18 of each magnetic amplifier are connected in series with the magnetic polarities indicated, and each of windings 18 is connected to series line 50, aforementioned. The pulsed inputs of gates 53 for amplifiers 45*a*, 45*b*, . . . 45*n* are connected to lines 33*a*, 33*b*, . . . 33*n* of switching matrix 34 for sequential pulsing of these lines as in the case of the circuit arrangement of FIG. 1. By reason of this arrangement, whichever gate is opened at any time connects its associated bias windings 17 and 18 in series via line 50 with the static bias string comprising the series connected windings 46 and 47 of all of the magnetic amplifiers.

It will be noted in FIG. 3, that the carrier windings 15 and 16 of all the magnetic amplifiers are connected in series with line 29 leading from the carrier current source which, as before, preferably supplies a pulsating uni-directional current of positive (+) polarity on line 29, as indicated.

The output windings 14 are connected in series across lines 36 and 37, as before, and any differential voltage appearing therein is amplified by amplifier 35 and the predetermined D.C. portion of its waveform gated by detector 38 and amplified by amplifier 39, as before, to present the outputs serially at terminal 40 and pass feedback current via resistor 41 to the series connected feedback windings 21, in the same manner as for the carrier switching arrangement of FIG. 1.

In the commutation of a plurality of input signals by means of the bias switching arrangement of FIG. 3, the input signals are continuously applied to input windings 13 and the carrier current continually supplied to all of the series connected carrier windings 15 and 16. Assuming the various windings to be connected as in the circuit arrangement of FIG. 3 with the magnetic polarities indicated, each of cores 11 and 12 is driven well into saturation, as indicated by point C in the B-H curve of FIG. 4, by reason of the bias current which passes continuously through the series connected bias windings 46 and 47, point C being referred to as the static point for the inactive channels. Carrier windings 15 and 16 have the same magnetic polarities as static bias windings 46 and 47, respectively and, hence, the carrier current drives each of the cores further into saturation as indicated at point $B+C$ in FIG. 4.

It will be recalled that at any one time, one of the gates 53 is open and, hence, its associated magnetic amplifier is activated by reason of the fact that its bias windings 17 and 18 are switched by the opened gate into series connection with the static bias string and thus receive the same bias current from bias source 26. Whereas windings 46 and 47 serve as saturating bias windings, windings 17 and 18, which respectively have opposite magnetic polarities, with respect thereto, serve as neutralizing bias windings in that they cancel the saturating bias effected by the static bias windings and further establish an operating bias as at point A in FIG. 4, this being referred to as a static operating point for an activated channel, the carrier current in this case, driving the cores of the activated magnetic amplifier from point A to point B in the B-H curve of FIG. 4. Since windings 17 and 18 receive the same current as saturating windings 46 and 47, it will be appreciated that they must have more turns in order to move the magnetic operating point to point A in FIG. 4 in addition to neutralizing the saturating bias of windings 46 and 47.

The family of magnetic amplifiers 45*a*, 45*b*, . . . 45*n* is thus commutated by a process in which the magnetic amplifiers are sequentially switched by matrix 34 and the gates 53 individual thereto from a saturated inactive state wherein the carrier current is ineffective to induce a voltage in the series connected output windings 14, notwithstanding the fact that input current may be present in the input windings 13, to an active operating state wherein the saturating bias of the activated magnetic amplifier is neutralized and an operating point established from which the carrier current is effective to traverse the B-H curve in a manner to induce a voltage in the output winding. Thus, as the magnetic amplifiers become sequentially active in this manner, their respective outputs appear sequentially in successive order at terminal 40 at the switching rate of matrix 34.

In each of the circuit arrangements of FIGS. 1 and 3, the output windings 14 are connected in series and must therefore be of low impedance so that the output signal appearing in one of the windings will not be attenuated by the others. Moreover, in the case of the carrier switching arrangement of FIG. 1, the difficulty of achieving complete cutoff of the uni-directional carrier current due to capacitive coupling must be recognized and the effect of spurious pickup of the carrier current in the inactive channels minimized as by saturating the cores through setting of the operating point A of FIG. 2 well into the region of saturation thereby to so greatly reduce the inductance of the inactive output windings 14 that the voltages therein and the voltage drops produced thereacross are negligible. In the case of the bias switching arrangement of FIG. 3, the continually supplied carrier current serves only to drive the inactive magnetic amplifiers further into saturation from the static point C of FIG. 4 and, for this reason, the bias switching arrangement of FIG. 3 has the advantage over the carrier switching arrangement of FIG. 1 in that the static point A for an active channel in FIG. 3 may be set within the unsaturated region of the B-H curve of FIG. 4, as indicated therein, and without regard for carrier coupling effects to which the inactive output windings may be subjected.

In considering this advantage of bias switching, it is presumed that the B-H curve in the region of saturation is flat. Since this is an ideal condition which can only be approached in practice, the output windings have some inductance even in the region of saturation and this may result in spurious pickup of the carrier current. Assuming, on the other hand, that complete saturation is achieved to a high degree, the windings become essentially air-cored and unbalance effects which were compensated on the basis of the windings being iron-cored become manifest as spurious outputs or unwanted impedances in the output windings. Where a large number of output windings are connected in series, the aggregate of the spurious effects in inactive channels may become appreciable. It will be understood that the output windings may be connected in parallel, but in such case, the windings must have sufficiently high impedance to avoid shunting of the output present in the active winding. Generally, it has been found in practice that the series arrangement is preferred even where a large number of channels of the order of upwards of 64 are employed.

Figures 4, 8:
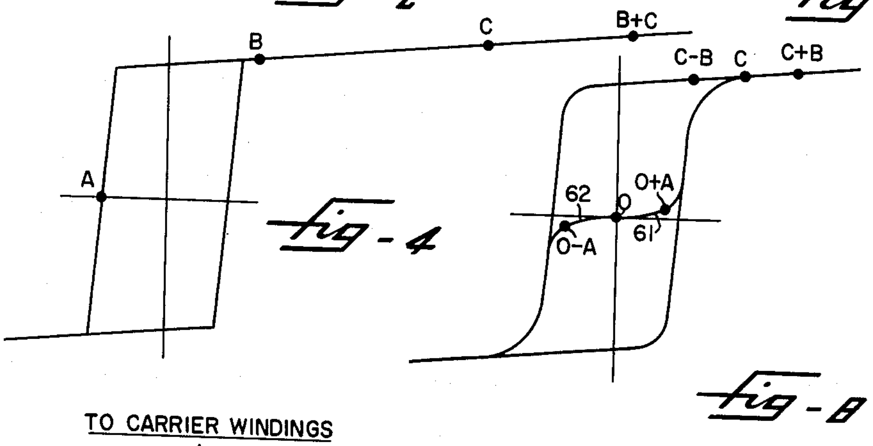
FIG. 4 is a B-H curve illustrating operation of the circuit of FIG. 3, the commutation method being one which utilizes magnetic amplifiers of the null detector type.
FIG. 8 is a view of a B-H curve which illustrates operation of the circuit of FIG. 3 when the commutation method utilizes magnetic amplifiers of the second harmonic type.
Figure 5:
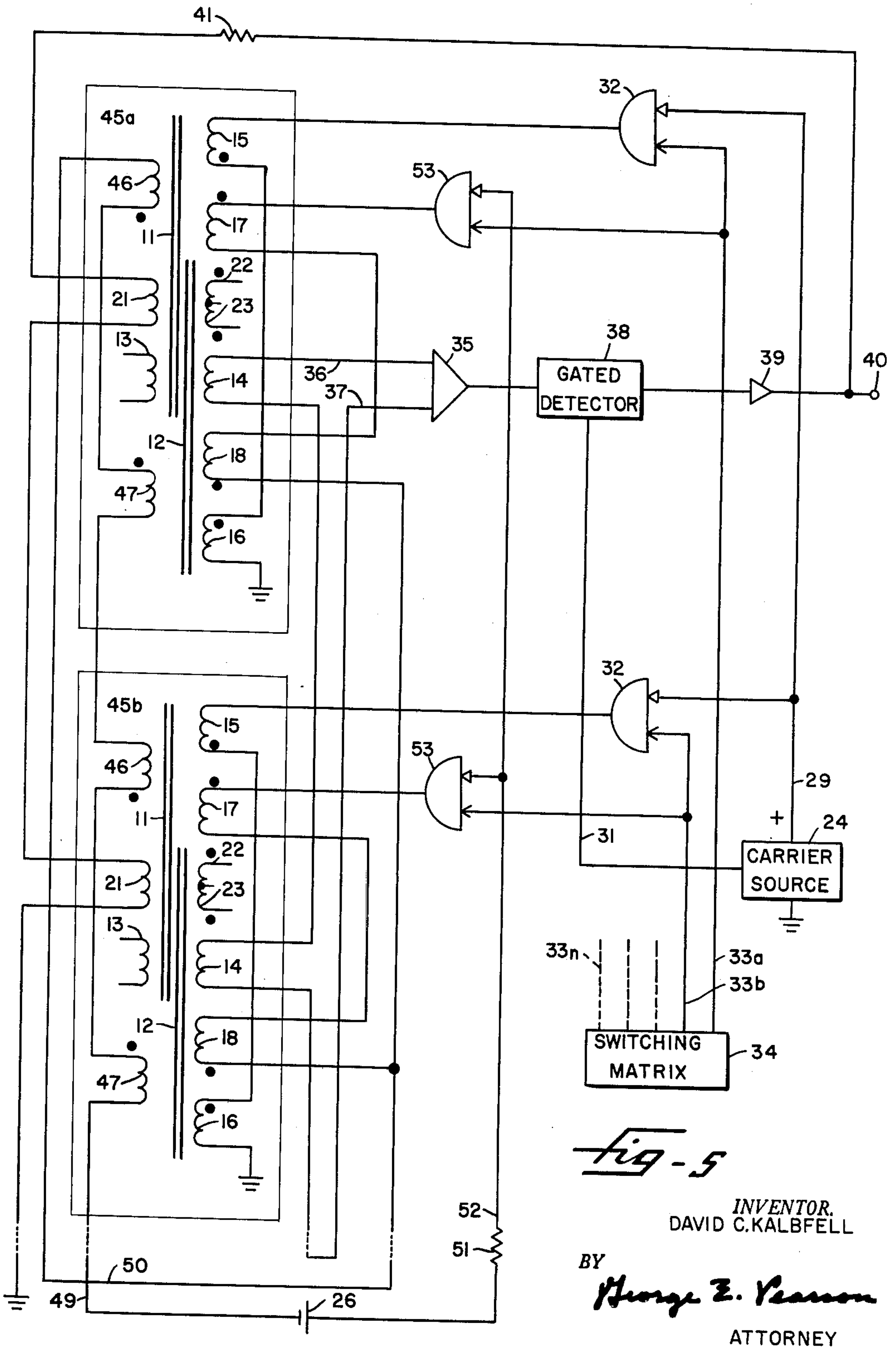
FIG. 5 is a circuit diagram illustrating a combination carrier and bias switching magnetic commutation system for practicing the combination carrier and bias switching method of the present invention.

The advantages of the carrier and bias switching arrangements of FIGS. 1 and 3 may be retained, while obviating the limitations or disadvantages in the individual use thereof, by combining the two types of switching as disclosed in FIG. 5 wherein the same family of magnetic amplifiers 45*a*, 45*b*, . . . 45*n* are employed and connected as in FIG. 3 except for the carrier windings 15 and 16 which are gated as disclosed in FIG. 1. To this end, pulsed lines 33*a*, 33*b*, . . . 33*n* from switching matrix 34 are connected respectively to the pulsed inputs of both gates 32 and 53 of magnetic amplifiers 45a, 45b, . . . 45n with the result that all but the active one of the magnetic amplifiers are biased at static inactive point C in FIG. 6, the active one whose gate 53 is opened, however, being biased at static operating point A, as heretofore described in connection with the operation of FIG. 3. Since its associated gate 32 is opened concurrently with gate 53, carrier current is supplied to windings 15 and 16 of the activated magnetic amplifier in the same manner as in the operation of FIG. 1. In the case of FIG. 5, however, the carrier current sweeps the relatively smaller B-H loop from points A to B in FIG. 6 rather than through the larger loop defined by the same points of FIG. 2. Furthermore, the inactive magnetic amplifiers merely sit at static point C in FIG. 6 and do not traverse the portion C to $B+C$ in FIG. 4 as in the case of the operation of FIG. 3 and, accordingly, the possibility of spurious outputs being introduced due to lack of flatness in the saturation region or to air-core effects is greatly reduced. In order to further reduce the possibility of spurious signal effects appearing in the output windings, suitable chokes (not shown) may be interposed on both sides of windings 46, 47 in the static bias string to prevent carrier-induced currents from flowing in these windings through paths resulting from their capacitance to ground. These chokes thus present high impedance paths to the voltage induced in windings 46, 47 of the activated magnetic amplifier.

Figure 6:
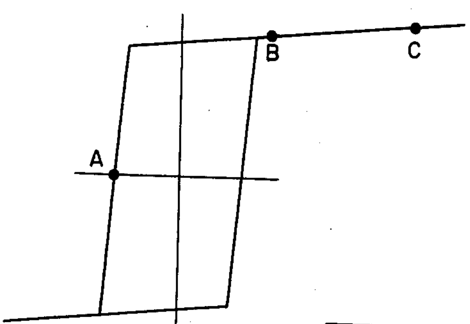
FIG. 6 is a B-H curve illustrating operation of the circuit of FIG. 5, the commutation method being one which utilizes magnetic amplifiers of the null detector type.
Figure 7:
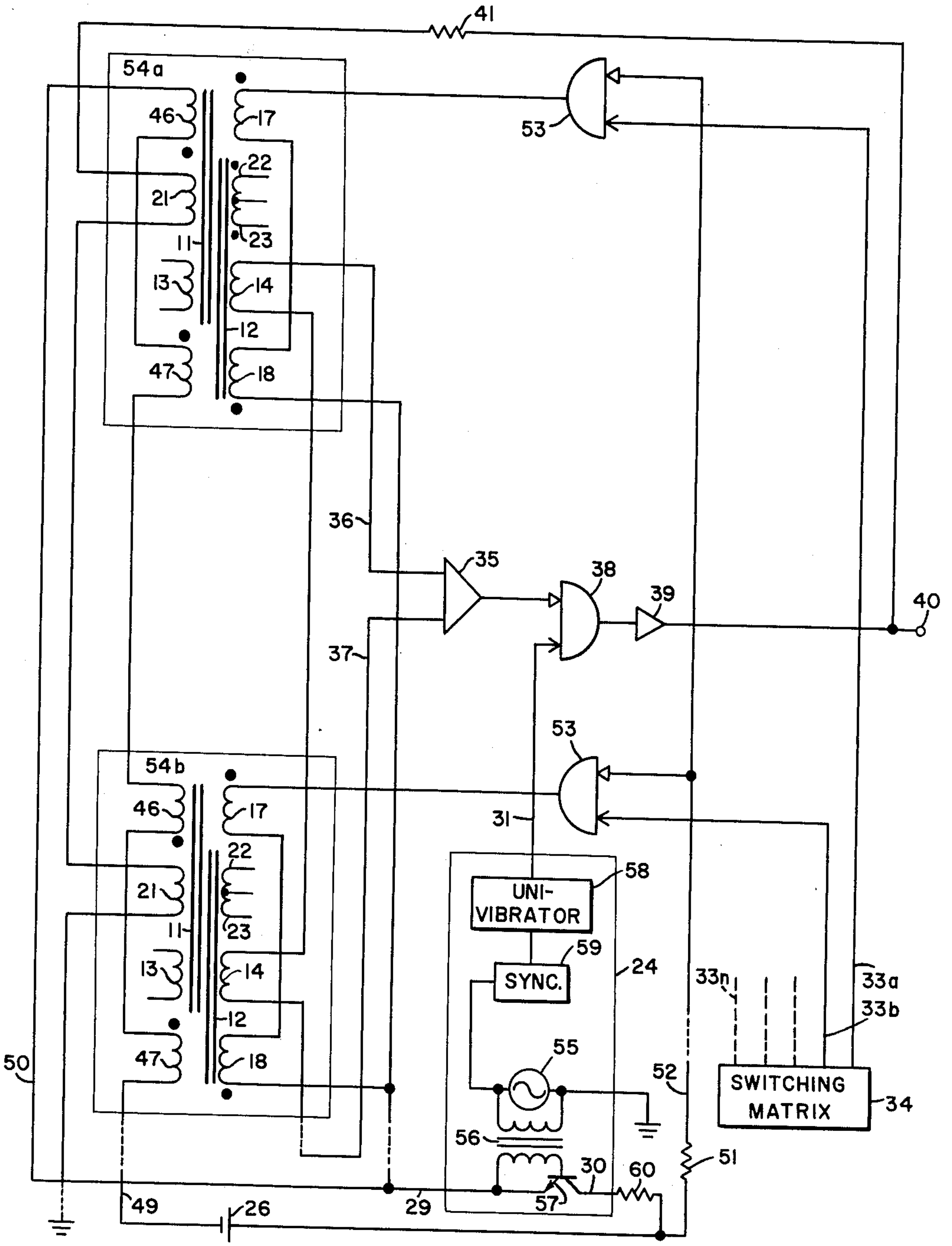
FIG. 7 is a circuit diagram illustrating a simplified bias switching magnetic commutation system in which the neutralizing bias windings also serve as carrier windings.

In FIG. 7 there is disclosed a bias switching commutation system which operates according to the B-H loop of FIG. 6, and generally in the same manner as the combination carrier and bias switching system of FIG. 5, without requiring the carrier windings 15 and 16 and their associated gates 32. For this purpose, the commutation system of FIG. 7 comprises a family of magnetic amplifiers 54a, 54b, . . . 54n which are identical to amplifiers 45a, 45b, . . . 45n disclosed in FIG. 5 except that the windings 15 and 16 are omitted and their function is provided by windings 17 and 18 which serve both as neutralizing and carrier windings.

The saturating bias windings 46 and 47 of the inactive magnetic amplifiers establish their cores at point C in FIG. 6, and the neutralizing windings 17 and 18 of the activated magnetic amplifier establish their cores at the static operating point A of FIG. 6 much in the same manner as in the operation of FIG. 5.

In order to cause the cores of the activated magnetic amplifier to traverse the B-H curve from A to B in FIG. 6, carrier source 24, with its D.C. source removed, is utilized to periodically bpyass a portion of the neutralizing current which would otherwise pass through the gated winding 17 and 18 as in the operation of FIG. 5, as will presently more fully appear.

The source of uni-directional carrier current 24, as utilized in FIGS. 1, 3, 5, and 7, comprises a sine wave generator 55 connected to energize a transformer 56 whose secondary switches on a transistor 57 on alternate cycles of the sine wave to thus pass pulsating unidirectional current from a D.C. source by way of lines 29 and 30. For purposes of FIGS. 1, 3 and 5, the D.C. source (not shown) would normally be connected between conductor 30 and the collector of transistor 57 disclosed in FIG. 7.

As aforementioned, in connection with the description of FIG. 1, the means for developing the gating pulse for detector gate 38, shown in FIG. 7 to be a conventional "AND" gate, comprises a univibrator 58 and appropriate synchronizing circuits 59.

For the purpose of FIG. 7, transistor 57, upon being rendered conducting during each alternate half cycle of the sine wave from generator 55, provides, together with a suitable current limiting resistor 60, a shunt path across the open gate 53 and neutralizing windings 17 and 18 connected in series therewith. The value of resistor 60 is selected so that the resistor bypasses sufficient neutralizing current to cause the cores to sweep the B-H loop from point A to point B in FIG. 6. The equivalent function of carrier windings 15 and 16 in FIG. 5 in response to the uni-directional carrier current received thereby from carrier source 24 is thus provided in FIG. 7 by windings 17 and 18 by a process of periodically subtracting or cancelling a portion of the neutralizing flux required to establish the activated magnetic amplifier at a static operating point from an initial condition of saturation, the gating arrangement being such that the saturating bias windings 46 and 47 receive the same total current during both of the transistor off and on times to thus hold the inactive magnetic amplifiers at point C in FIG. 6.

The bias switching commutation method and system of FIG. 3 is adaptable to the use of magnetic amplifiers of the second harmonic type by making certain changes in the construction of the magnetic amplifiers 45a, 45b, . . . 45n, amplifier 35, matrix 34, carrier source 24, and gated detector 38, and by making appropriate reductions in the magnetomotive forces employed such that the cores operate generally in accordance with the B-H curve disclosed in FIG. 8 wherein the point C designates the static point for an inactive channel as established by the saturating bias windings 46 and 47, points $C+B$ and $C-B$ respectively represent the sweep effected by alternating half cycles of the bi-directional carrier current supplied by carrier source 24, point O represents the static operating point for an active channel as established by the neutralizing bias windings 17 and 18, and the points $O+A$ and $O-A$ respectively represent the sweep effected by the carrier current from the point O for a condition of zero input to the active channel. It will be understood that in order to establish the static operating point O, from the saturating point C, the series connected saturating and neutralizing bias windings 46, 47 and 17, 18 must have the same number of turns since they receive the same current.

The operation of second harmonic devices of the aforedescribed type is well known and its suffices therefore merely to state herein that the portions 61 and 62 of the B-H curve being symmetrical about static operating point O, only odd harmonics are induced in an output winding 14 when the input to its associated winding 13 is zero. When a D.C. input is received, the carrier-induced sweep about the B-axis is unsymmetrical and a second harmonic output appears in output winding 14, the amplitude of which is proportional to the magnitude of the input to winding 13 and the phase of which is dependent upon the polarity of the input.

Figure 9:
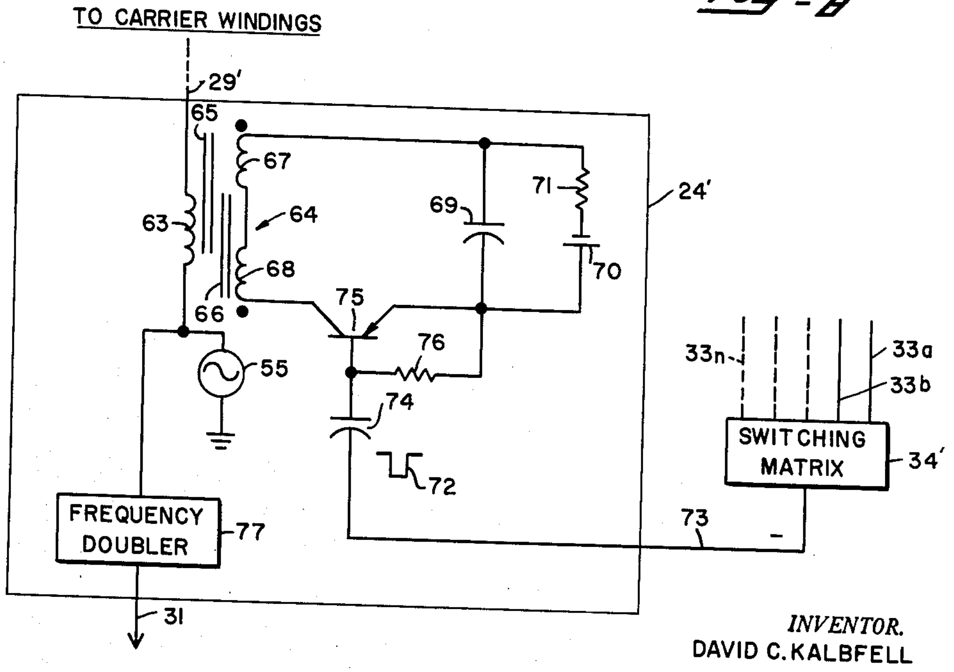
FIG. 9 is a circuit diagram illustrating the construction of the carrier source to provide for demagnetizing of the cores in the second harmonic type system.

In order to operate FIG. 3 in the second harmonic mode of magnetic amplifiers 45a, 45b, . . . 45n, carrier source 24 and matrix 34 are modified as disclosed in FIG. 9 wherein these reference characters are primed to indicate the modification and wherein it will be seen that the sine wave output of generator 55 is supplied through a winding 63 which is connected in series with the carrier windings 15 and 16 by way of line 29'. Winding 63 forms a part of a saturable core reactor 64 comprising cores 65 and 66 having control windings 67 and 68 respectively individual thereto. Cores 65 and 66 normally are not saturated such that the impedance of winding 63 limits the amplitude of the carrier current such that the carrier-induced sweep is as depicted in FIG. 8. When saturating current is supplied to control windings 67 and 68, however, the impedance of winding 63 becomes greatly reduced and the carrier current supplied via line 29 becomes greatly increased such that the carrier current drives the cores into saturation, this being for a purpose presently to appear.

Since the curve portions 61 and 62 traversed by reason of carrier current supplied to an active channel are at low magnetomotive force levels in the unsaturated region of the B-H curve of FIG. 8, D.C. signal inputs are not cancelled and produce remanent effects which would become manifest as spurious signal inputs if permitted to remain. These remanent effects are removed by degaussing the cores 11 and 12 of the activated channel concurrently with the activation thereof. This is accomplished by energizing control windings 67 and 68 with an attenuating D.C. saturating current such that cores 11 and 12 of the magnetic amplifiers are periodically driven by saturating alternating fluxes of progressively decreasing amplitude until the static operating condition $O+A$, $O-A$ is reached after a predetermined brief period comprising only a few cycles of the carrier current. It will be noted that, for this purpose, windings 67 and 68 have opposing magnetic polarities and thus cores 65 and 66 are saturated for both half cycles of the alternating output of generator 55.

The control current for saturable reactor 64 preferably is supplied by a condenser 69 which charges to the potential of a D.C. source 70 through a resistor 71 during the portion of each commutation period following the degaussing of the cores. Concurrently with activation of a channel by emission of a gating pulse from switching matrix 34′ onto one of lines 33*a*, 33*b*, . . . 33*n*, a negative pulse 72 is emitted from matrix 34 onto line 73. This pulse is applied via condenser 74 to the base of a transistor 75 whose emitter is connected to winding 68 and whose collector is connected to condenser 69, the other side of the condenser being connected to winding 67. Transistor 75 is rendered conducting by pulse 72 to thus discharge condenser 69 through the series connected windings 67 and 68, a bias resistor 76 being employed to control the rate of discharge. The amplitude-time function of the discharge current from condenser 69 thus provides the attenuating current desired for the degaussing process.

The sine wave output of generator 55 is doubled by frequency doubler 77 which may be of any known type to provide a second harmonic control on gating line 31 to thus match the output of amplifier 35, FIG. 3, which is tuned to pass the second harmonic output of windings 14. Detector 38 for this purpose may be of any known type of phase detector suitable for the purpose such, for example, as the phase-sensitive push-pull tube circuit described by William A. Geyger, pages 269–270, "Magnetic-Amplifier Circuits" Second Edition. The output of detector 38 will be a series of half cycles at the second hramonic frequency and will in effect comprise a gated portion of the waveform of the outputs from the magnetic amplifiers as in the case of the magnetic amplifiers of the null detector type heretofore described, and the D.C. component of this half cycle portion of the output waveform is amplified by amplifier 39, presented at output terminal 40, and applied as feedback to series connected windings 21 in the same manner as previously described in connection with the null detector mode of operation of the circuit of FIG. 3.

Figures 10, 11:
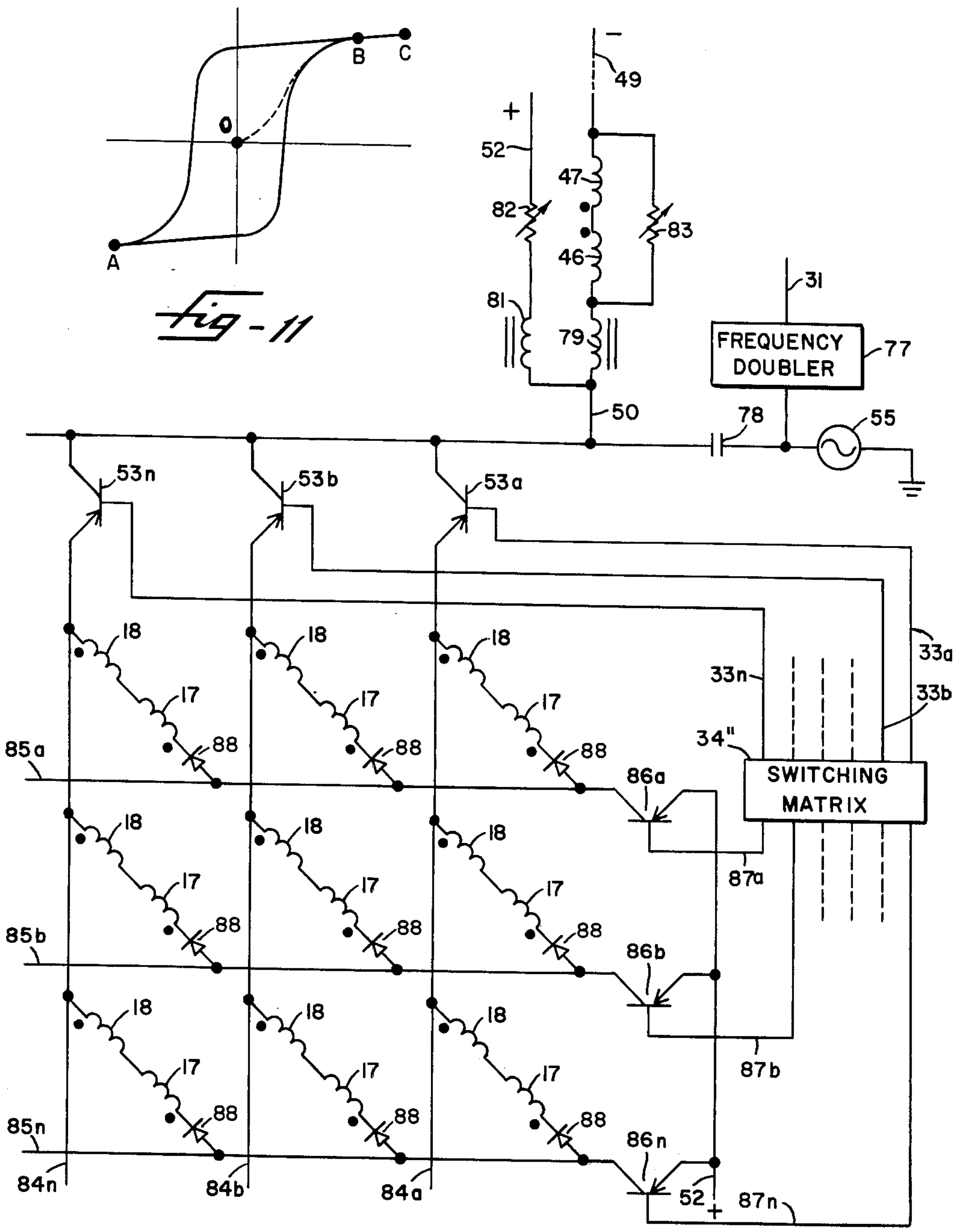
FIG. 10 is a circuit diagram illustrating the so-called component mode of switching carrier and neutralizing currents in a second harmonic system.
FIG. 11 is a view of a B-H curve which illustrates the operation of the circuit of FIG. 10.

FIG. 10 discloses an arrangement in which a bias string network similar to that disclosed in FIG. 7 may be substituted therefore in FIG. 7 to provide a second harmonic commutating system having the so-called component mode of switching the carrier and neutralizing currents. As in FIG. 7, the neutralizing windings 17 and 18 of the family of magnetic amplifiers are switched in sequential order into series with the series string of bias windings 46 and 47 which are connected by way of line 49 to the negative terminal of source 26. Also, as in FIG. 7, the windings 17, 18 serve as combined neutralizing and carrier windings, although the manner of sweeping the cores through their B-H loops is different as will presently appear.

In FIG. 10, carrier current from source 55 is applied via D.C. blocking condenser 78 to line 50 which feeds the static string. Suitable chokes 79 and 81 prevent the carrier current from respectively passing through the static bias string and to positive line 52. The carrier current, however, passes to the neutralizing windings 17, 18 by way of gates 53*a*, 53*b*, . . . 53*n*, here shown to be transistors, when one of these gates is opened by a pulse received, as before, by way of one of lines 33*a*, 33*b*, . . . 33*n* from switching matrix 34″.

The neutralizing current is supplied, as in FIG. 7, from positive potential on line 52, and as disclosed in FIG. 10, passes through gates 86*a*, 86*b*, . . . 86*n* which are opened by pulses received sequentially on lines 87*a*, 87*b*, . . . 87*n* from switching matrix 34″ which coordinates the gating of the two-dimensional matrix such that windings 17, 18 of this matrix are switched in sequential order in series with line 50.

The aplitude of the carrier current received by each set of windings is adjusted by adjusting the loading resistor 83 connected across its associated bias windings 46, 47, these in certain core and winding configurations being more readily accessible for this purpose than the windings 17, 18. The amplitude of the carrier current is adjusted to a value which is less than the magnitude of the neutralizinig current so that the carrier current will thus merely effect fluctuations in the neutralizing current which, being uni-directional, will pass through the conventional matrix diodes 88.

The transistors require base current for operation of the gates and for this reason, the neutralizing current passing through windings 17, 18 from line 52 includes the base current required for the activated one of gates 53*a*, 53*b*, . . . 53*n* and therefore exceeds the current which reaches static bias windings 46, 47. In order to equalize the current received by the static bias and neutralizing windings, additional current is supplied to windings 46, 47 from positive potential on conductor 52 and in suitable amount adjustable by variable resistor 82.

In the operation of FIG. 10, all but the activated magnetic amplifiers are biased to saturation by their static bias windings 46, 47 as indicated at point C in the B-H loop of FIG. 11, the activated amplifier being restored to operating point O by reason of its bias being neutralized by windings 17, 18 individual thereto which are connected in series with the static bias string and therefore energized by the D.C. neutralizing current which passes therethrough. The carrier current from source 55 also traverse windings 17, 18 and, hence, after a few cycles the cores are swept to point B in the B-H loop of FIG. 11 and, thereafter, the B-H loop is traversed between the points A and B as long as the amplifier remains activated, the traverse being shifted to the left or right, as before noted, in accordance with the polarity of any signal present at the input winding. In the second harmonic circuit arrangement of FIG. 10, the cores are driven into saturation at both ends of the B-H loop of FIG. 11 and, accordingly, provision for degaussing the core prior to activation of the amplifiers, as in FIG. 9, is not required.

The operation described above may be summarized as follows: The diodes 88 are essential in order to avoid alternate "sneak paths" for current to flow from a gate 53 to a gate 86. However, such diodes will not pass alternating current, and hence would appear to prevent the commutation of an alternating carrier current signal such as required for harmonic mode operation. The system of FIG. 10 circumvents this problem by superimposing a large enough direct current component on the alternating carrier component so that the net current switched by the matrix is unidirectional at all times. It proves to be impractical to build power supplies which are stable enough to cancel this D.C. component of the carrier precisely enough if separate supplies were used to power the bias (or counterbias) windings. In harmonic operation, it is desirable to have no net D.C. bias, but simply a pure alternating current carrier. FIG. 10 solves this problem by furnishing the superimposed direct current component of carrier from the same power supply which is furnishing the counterbias through windings 46 and 47. Resistors 82 and 83 act as vernier trimmers to compensate for base current of gates 53 and for other residual unbalances.

Frequency doubler 77 gates a second harmonic detector 38 as decribed heretofore in connection with FIG. 9 such that a D.C. component is developed from the series of half cycles at the second harmonic frequency and supplied to feedback windings 21 of FIG. 7 in the same manner as heretofore described in connection therewith.

From the foregoing, it should now be apparent that various commutation methods and systems have been provided which are well adapted to fulfill the aforestated objects of the invention. It is to be understood, however, that the invention may be embodied in other forms or carried out in other ways without departing from the spirit or essential characteristics thereof. The methods and embodiments of the invention hereinbefore disclosed therefore are to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. A commutating system comprising a family of linear magnetic amplifiers each having a pair of cores formed of magnetic material having high maximum differential permeability, each said amplifier having input, output, and feedback windings on both of said cores, each said amplifier having a pair of oppositely polarized bias windings disposed respectively on said pair of cores, each said amplifier having a pair of oppositely polarzied carrier windings disposed respectively on said pair of cores, a common output terminal connected to the output winding of each of said amplifiers, means including the bias windings of each of said amplifiers and statically biasing the same in the region of saturation of said core material at one end of the B-H loop, means for sequentially counterbiasing the static bias and supplying carrier current to the carrier windings of each amplifier each in successive order and with amplitude sufficient to periodically sweep said core material into saturation at the other end of the B-H loop, gate means connected to said output terminal and operable at the sweep frequency of said carrier current, and means connecting said gate means to said feedback windings.

2. A commutating system comprising a family of linear magnetic amplifiers, said amplifiers respectively having input, output, bias and counterbias windings, a common terminal connecting said output windings, said bias windings being connected in series to form a static bias string, said bias windings each having fewer turns than its associated counterbias winding, means for sequentially switching said counterbias windings of each amplifier in successive order in series with said static bias string, means for supplying bias current to said static bias string and its series connected counterbias winding sufficient to set the operating point of the counterbiased amplifier in the non-saturated region on one side of the B-H loop of its core material while holding the other amplifiers at a static bias point in the saturated region on the other side of the B-H loop, a source of alternating current, and means connected to said source and operable during half cycles of said alternating current for periodically bypassing a sufficient portion of said bias current to said series connected counterbias winding to periodically sweep its associated core material back to said saturated region.

3. A commutator system as in claim 2, each said amplifier having a pair of cores formed of magnetic material having high maximum differential permeability, said input and output windings for each amplifier being wound on both of said cores, each amplifier having a pair of bias windings respectively wound with opposed magnetic polarities on said pair of cores, each amplifier having a pair of counterbias windings respectively wound with opposed magnetic polarities on said pair of cores.

4. A commutator system as in claim 3, each magnetic amplifier having a feedback winding wound on both cores of said pair of cores, the feedback windings of said family of amplifiers being connected in series, the output windings of said family of amplifiers being connected in series, and a synchronous detector connected to said source of alternating current and interconnecting said output terminal and said series connected feedback windings.

5. A commutating system comprising a family of linear magnetic amplifiers each having a pair of cores formed of magnetic material having high maximum differential permeability, each amplifier having input and output windings each wound on both cores of said pair, each amplifier having a pair of bias windings wound respectively with opposed magnetic polarities on said cores of the pair of cores, each amplifier having a pair of counterbias windings wound respectively with opposed magnetic polarities on said cores of the pair of cores, said bias and counterbias windings having the same number of turns, a source of alternating current, a two-dimensional matrix, a plurality of diodes individual to the plurality of pairs of counterbias windings of said amplifiers and respectively connected in series therewith in said matrix, a D.C. source, said bias windings being connected in series to said D.C. source to form a static bias string, and means connected to said matrix for sequentially switching said pairs of counterbias windings and their series connected diodes to said static bias string in series therewith each pair in successive order and concurrently therewith connecting said alternating current source across each pair of said counterbias windings and its connected diode as the same are switched into series with said static string.

6. A commutating system as in claim 5, said matrix comprising transistor switches, and means for supplying base current from said D.C. source to said transistor switches sufficient to equalize the bias currents received respectively by said bias and counterbias windings.

7. A commutating system as in claim 5, said static string having choke means for excluding said alternating current therefrom and said alternating current having an amplitude less than the magnitude of said bias current.

8. A commutating system as in claim 5, said amplifiers respectively having feedback windings each wound on both cores of its associated pair of cores, said feedback windings being connected in series, an output terminal, said amplifiers having their respective output windings connected in series to said terminal, a second harmonic detector interconnected between said series connected feedback windings and said terminal, and a frequency doubler interconnected between said source of alternating current and said second harmonic detector.

9. A communating system as in claim 5, said switching means comprising a switching matrix for sequentially supplying gating pulses to said transistor switches in said two-dimensional matrix.

10. A commutating system comprising a family of harmonic modulators, each of said modulators having an input winding, an output winding, a bias winding, and a carrier winding having the same number of turns as the bias winding, a diode in series with each carrier winding, a plurality of horizontal and vertical gates, said carrier windings and their respective diodes being arranged in a two-dimensional matrix fed through said horizontal and vertical gates; a carrier source of alternating current, a bias source of direct current, means for passing the bias current through all of the bias windings continuously, and means for energizing the horizontal and vertical gates sequentially to pass the sum of the bias current and the alternating carrier current through the carrier windings one at a time sequentially, the bias current component flowing through said one of the carrier windings being polarized to offset the bias current flowing through the bias winding of the energized modulator.

11. A commutating system as in claim 10 and including means for vernier adjustment of the bias current differentially with respect to the bias current component flowing through the carrier windings to compensate for imperfections in the gates.

References Cited by the Examiner

UNITED STATES PATENTS

| | | | |
|---|---|---|---|
| 2,424,977 | 4/47 | Grieg | 332—12 |
| 2,574,438 | 11/51 | Rossie et al. | 307—88 |
| 2,825,890 | 3/58 | Ridler. | |
| 2,828,482 | 3/58 | Schumann | 307—88 X |
| 2,834,893 | 5/58 | Spencer | 307—88 |
| 2,850,725 | 9/58 | Beaumont | 307—88 X |
| 2,861,244 | 11/58 | Schumann | 332—51 |
| 2,862,190 | 11/58 | Schumann | 332—51 |
| 2,931,017 | 3/60 | Bonn et al. | |
| 2,972,059 | 2/61 | Bonn et al. | 307—88 |
| 2,972,136 | 2/61 | Gieseler | 307—88 X |
| 2,978,694 | 4/61 | Kalbfell. | |
| 2,989,648 | 6/61 | Kalbfell | 307—88 |
| 3,054,092 | 9/62 | Breitling. | |

FOREIGN PATENTS

| | | | |
|---|---|---|---|
| 3,032,747 | 5/62 | France. | |

IRVING L. SRAGOW, *Primary Examiner.*

EVERETT R. REYNOLDS, *Examiner.*